(12) United States Patent
Kuusinen et al.

(10) Patent No.: US 9,007,123 B2
(45) Date of Patent: *Apr. 14, 2015

(54) APPARATUS, AND ASSOCIATED METHOD, FOR COMMUNICATING PACKET DATA IN A NETWORK INCLUDING A RADIO-LINK

(75) Inventors: Jarmo Kuusinen, Tampere (FI); Matti Turunen, Tampere (FI)

(73) Assignee: Nokia Corporation, Espoo (FI)

( * ) Notice: Subject to any disclaimer, the term of this patent is extended or adjusted under 35 U.S.C. 154(b) by 842 days.

This patent is subject to a terminal disclaimer.

(21) Appl. No.: 10/880,027

(22) Filed: Jun. 28, 2004

(65) Prior Publication Data

US 2005/0041581 A1  Feb. 24, 2005

Related U.S. Application Data

(63) Continuation of application No. 09/585,203, filed on Jun. 1, 2000, now Pat. No. 6,757,245.

(51) Int. Cl.
| | |
|---|---|
| H04W 4/00 | (2009.01) |
| H04J 3/14 | (2006.01) |
| H04L 1/00 | (2006.01) |
| H04L 12/26 | (2006.01) |
| H04L 12/28 | (2006.01) |
| H04W 28/18 | (2009.01) |
| H04W 24/00 | (2009.01) |
| H04W 28/04 | (2009.01) |

(52) U.S. Cl.
CPC .............. *H04W 28/18* (2013.01); *H04W 24/00* (2013.01); *H04W 28/04* (2013.01)

(58) Field of Classification Search
CPC ...... H04W 24/00; H04W 28/04; H04W 28/18

USPC .......... 370/328–338; 455/422.1, 426.1–426.2
See application file for complete search history.

(56) References Cited

U.S. PATENT DOCUMENTS

| | | | | |
|---|---|---|---|---|
| 5,291,481 | A | * | 3/1994 | Doshi et al. ................... 370/230 |
| 5,442,637 | A | | 8/1995 | Nguyen |
| 5,550,848 | A | | 8/1996 | Doshi et al. |
| 6,038,246 | A | * | 3/2000 | Shimizu et al. .................. 373/78 |
| 6,105,064 | A | * | 8/2000 | Davis et al. .................... 709/224 |
| 6,108,315 | A | * | 8/2000 | Freeburg et al. ............... 370/310 |

(Continued)

FOREIGN PATENT DOCUMENTS

| | | |
|---|---|---|
| WO | 9636150 A1 | 11/1996 |
| WO | 9963702 A1 | 12/1999 |

(Continued)

OTHER PUBLICATIONS

Comer, Douglas E. , Internetworking with TCP/IP, 1991, Prentice-Hall, 2nd Ed., vol. 1, pp. 182-184,188-190.*

(Continued)

*Primary Examiner* — Marcus R Smith
*Assistant Examiner* — Lonnie Sweet
(74) *Attorney, Agent, or Firm* — Banner & Witcoff, Ltd.

(57) ABSTRACT

Apparatus, and associated method, for improving packet data communications upon a communication path including a radio-link. Determination is made of the conditions on the radio-link when selecting the optimal size of a transmission window within which to transmit packets of data. And, retransmission time-out values are also selected responsive to the indications of the radio-link conditions.

48 Claims, 5 Drawing Sheets

(56) References Cited

U.S. PATENT DOCUMENTS

| | | | |
|---|---|---|---|
| 6,118,765 A * | 9/2000 | Phillips | 370/235 |
| 6,141,565 A * | 10/2000 | Feuerstein et al. | 455/560 |
| 6,181,683 B1 * | 1/2001 | Chevillat et al. | 370/329 |
| 6,198,941 B1 * | 3/2001 | Aho et al. | 455/552.1 |
| 6,205,120 B1 | 3/2001 | Packer et al. | |
| 6,208,620 B1 * | 3/2001 | Sen et al. | 370/231 |
| 6,405,337 B1 * | 6/2002 | Grohn et al. | 714/749 |
| 6,415,410 B1 * | 7/2002 | Kanerva et al. | 714/749 |
| 6,473,399 B1 | 10/2002 | Johansson et al. | |
| 6,473,793 B1 * | 10/2002 | Dillon et al. | 709/223 |
| 6,584,080 B1 * | 6/2003 | Ganz et al. | 370/315 |
| 6,608,818 B1 * | 8/2003 | Abrol et al. | 370/252 |
| 6,690,679 B1 * | 2/2004 | Turunen et al. | 370/469 |
| 6,751,234 B1 * | 6/2004 | Ono | 370/474 |
| 6,757,255 B1 * | 6/2004 | Aoki et al. | 370/252 |
| 6,992,982 B1 * | 1/2006 | Meyer et al. | 370/231 |
| 7,035,214 B1 * | 4/2006 | Seddigh et al. | 370/231 |
| 2003/0012217 A1 * | 1/2003 | Andersson et al. | 370/437 |

FOREIGN PATENT DOCUMENTS

| | | |
|---|---|---|
| WO | 0076139 A1 | 12/2000 |
| WO | 0122645 A1 | 3/2001 |

OTHER PUBLICATIONS

DeSimone, Antonio, et al.; "Throughput Performance of Transport-Layer Protocols Over Wireless LANs"; AT&T Bell Laboratories, Holmdel NJ 07733-3030 USA; 1993, IEEE, pp. 542-549.

Ziegler, T., et al.; Congestion Avoidance with BUC (Buffer Utilization Control) Gateways and RFCN (Reverse Feedback Congestion Notification); University of Salzburg, Jakob-Haringer Str. 2; A-5020, Salzburg, Austria; 1997 IEEE; pp. 410-418.

* cited by examiner

APPARATUS, AND ASSOCIATED METHOD, FOR COMMUNICATING PACKET DATA IN A NETWORK INCLUDING A RADIO-LINK

CROSS-REFERENCE TO RELATED APPLICATION

This application is a continuation of U.S. patent application Ser. No. 09/585,203, filed on 1 Jun. 2000 now U.S. Pat. No. 6,757,245.

The present invention relates generally to the communication of packet data, such as TCP-formatted data, in a communication system which includes a radio-link, such as a UMTS (universal mobile telephone service) wireless data network. More particularly, the present invention relates to apparatus, and an associated method, by which, more optimally to communicate data packets in the UMTS, or other, communication system.

BACKGROUND OF THE INVENTION

Advancements in communication technologies have permitted the introduction of, and popularization of, new types of communication systems. As a result of such advancements, significant increases in the rates of data transmission, have been permitted. And, new types of communication services have also been made possible.

A radio communication system is exemplary of a type of communication system which has benefited from advancements in communication technologies. At least a portion of a communication path utilized in a radio communication system includes a radio-link. A radio communication system inherently increases communication mobility as communication channels defined in such a system are formed of radio channels and do not require wireline connections for their formation.

Advancements in digital communication techniques are amongst the advancements in communication technologies which have permitted the introduction of the new types of communication systems. Communications effectuated through the use of digital communication techniques are generally of improved bandwidth efficiencies in comparison to communications effectuated utilizing conventional, analog techniques.

A packet data communication system is also exemplary of a communication system made possible as a result of advancements in communication technologies. In a packet communication system, groups of digital bits are formatted into packets to form packets of data. The packets of data are communicated, either individually, or in groups, at discrete intervals. Once received, the packets of data are concatenated together to recreate the informational content of the digital bits of which the packets are formed.

Because packets of data can be communicated at discrete intervals, the communication channel upon which the packets are transmitted need not be dedicated to a single communication pair. Instead, a shared communication channel can be used by a plurality of communication pairs to communicate packets of data on the shared channel.

Standardized protocols by which to format and to communicate packets of data have been developed. A TCP/IP (transmission control protocol/ Internet protocol) is exemplary of a packet formatting scheme. And, an X.25 protocol describes another exemplary protocol scheme. Standards relating to conventional packet communication systems have been promulgated for both conventional wireline, as well as wireless, systems.

Packet radio services have been proposed, for instance, for several different cellular communication systems. A cellular communication system is a type of radio communication system, widely implemented and popularly-used. Exemplary of such a packet radio service is the GPRS (General Packet Radio Service) system for GSM (Global System for Mobile Communications).

One proposal is for a so-called 3G (third generation) cellular communication system, referred to as a UMTS (universal mobile telecommunications system) network. Packet data communications are provided for therein. In this proposed system, as well as others, packet data is communicated between a mobile host and a network host. A communication path formed between the mobile and network hosts includes at least one radio-link formed between the mobile host and infrastructure of the UMTS network. Proposals related to the UMTS network include the use of TCP/IP protocols for end-to-end communications, viz., for communications over the wireless and also the fixed parts of the UMTS network. Such a service is typically a "best effort" service, i.e., a service without a guaranteed quality of service. The infrastructure of the UMTS network includes both a wireline IP-based UMTS core network and a radio part, i.e., a radio-link, formed between the mobile host and a base station, forming a portion of the UMTS core network. TCP-based protocols have, however, conventionally been designed for conventional, wireline networks. In conventional TCP protocols, measures intended to control the flow of data and possible congestion within the communication network are designed according to the characteristics of wireline networks where packet losses are often the result of congestion. Congestion arises, for instance, because of the aforementioned sharing of communication resources for different communication pairs. When a packet communication system is implemented in wireless form, however, packet losses are often due to bit errors and/or packet losses introduced during transmission on a radio-link.

Because a UMTS network includes both a wireline, core network and also a radio part, packet losses occurring at the radio part, such as due to communication handovers or corruption on the radio-link are retransmitted locally. When the UMTS is defined in terms of logical layers, local retransmission means, for example, that data packets are retransmitted over the radio link by a radio-link control (RLC) layer. These local retransmissions decrease end-to-end throughput between the mobile and network hosts due to the time required to effectuate the local retransmissions. If a conventional TCP protocol is used in connection with a data transmission network, such as a UMTS network, implemented at least in part over a radio communication link, a sending station originating TCP data continues sending packet data at a constant rate, irrespective of the local retransmissions at the radio part of the network. Thus, the possibility for congestion of the UMTS core network increases, as new packets are transmitted from the network host in the fixed line part of the network while earlier packets are still undergoing retransmission over the radio link to recover from losses in the radio-link. Deleterious results, such as spurious time-outs of the sending station, can occur, significantly reducing the end-to-end performance of the network.

Spurious time-outs occur because of the additional time taken to receive acknowledgments for data packets that are retransmitted over the radio-link under local control of a radio link control layer (RLC). If data packets are retransmitted by the radio link control layer, additional time elapses before the sending TCP protocol in the mobile host receives an acknowledgment that a particular packet has been received by the receiving host e.g. in the fixed line part of the network. By the time an acknowledgment is received, the TCP,retransmission timer in the mobile host may have already expired and conventional congestion control measures may have been initiated by the sending TCP, resulting in decreased data throughput. Furthermore, in this situation, initiation of conventional congestion control mechanisms is erroneous because the delayed acknowledgment was due to the additional time required for retransmission over the radio link, rather than real congestion in the network. According to the invention, this erroneous initiation of TCP congestion control measures is prevented by increasing TCP timer time-out values in conditions where there is an increased likelihood of retransmission over the radio link, for example in situations where there is degradation in the quality of the radio-link or a decrease in the bandwidth available for communication over the radio link. On the other hand, if true congestion of the communication network occurs, the method according to the invention still allows conventional congestion control measures to be initiated.

If a manner could be provided by which better to effectuate packet data transmission by a sending station to take into account the performance of the radio part of the system, improved system operation would result.

QoS (Quality of Service) levels are also proposed to be defined in the UMTS network. The QoS levels define, in general, performance parameters pursuant to which a particular communication service is to be effectuated. Several communication services are non-real-time services, such as communications with the WWW (World Wide Web), TELNET™, e-mail services, etc. Applications to effectuate such services, logically, run on top of a TCP logical layer. And, such communication services typically are implemented at QoS levels referred to as"best-effort" traffic classes. Such traffic classes do not give guarantees of available bandwidth and, hence, delivery times. Conversely, communication services which are of a real-time nature typically are implemented at higher QoS levels and such communication services are effectuated with a higher priority than non-real-time TCP-related services. Because of the lower priority levels of the TCP-related, non-real-time services, the bandwidth available to effectuate such services is susceptible to rapid change.

Conventional manners by which to effectuate TCP flow control do not include a manner by which to set transmission rates according to such rapid changes. In conventional TCP implementations, a standard mechanism, referred to as self-clocking behavior is used to limit the transmission rate of a sending station. Self-clocking behavior refers to a manner by which the sending station is able to send a new packet, responsive to reception of an acknowledgment of an earlier-transmitted packet, if the size of the transmission window remains constant. In conventional TCP operation, however, the transmission window is not constant. Instead, the transmission window is of a size which is adjusted regularly, according to the arrival of acknowledgments and occurrence of retransmission time-outs. In practice, then, in standard operation, a sending station increases a transmission window size until some point in a communication path, such as the radio access node (RAN).

Thereafter, congestion control mechanisms are implemented, but such implementations abruptly slow down transmission rates of communications. This behavior also results in reduced end-to-end throughput rates.

If a manner could be provided by which better to effectuate communication of packet data by taking into better account changes of bandwidth availabilities for the communication of the packet data, improved system operation would further result.

It is in light of this background information related to packet data communications that the significant improvements of the present invention have evolved.

SUMMARY OF THE INVENTION

The present invention, accordingly, advantageously provides apparatus and an associated method, by which more optimally to communicate data packets in a packet communication system, such as a UMTS (Universal Mobile Telecommunications System) wireless data network.

Operation of an embodiment of the present invention better optimizes the size of a transmission window within which a sending station sends a packet of data. By better selecting the size of the transmission window, the throughput rates of data communication of the packet data is improved.

Operation of a further, or alternate, embodiment of the present invention provides a manner by which to adjust a retransmission timer responsive to changes in the characteristics of a radio-link upon which data packets are communicated. The timer is adjusted in a manner to reduce the occurrence of spurious retransmissions as a result of changing radio-link conditions.

In one aspect of the present invention, apparatus is provided for a mobile station, herein referred to as a mobile host, by which to select an optimal transmission window within which a data packet is to be transmitted thereto by a network host. Determination is made at the mobile host of the optimal size of the transmission window responsive to determination of throughput rates, or other link status indication related to the radio-link. Responsive to the measured, or otherwise determined, indication, selection is made of the optimal transmission window size. A value respective of the optimal transmission window size is then sent to the network host. The optimal transmission window size is used by the network host as a maximum size of the transmission window within which the network host thereafter transmits a data packet.

In another aspect of the present invention, apparatus is provided for a mobile host to select a time-out value for a retransmission timer of the mobile host. Measurement, or other determination, of a radio-link quality indication is made. Responsive to a value of the radio-link quality being beyond a threshold value, the timer's time out value is adjusted. In one implementation, the radio link quality indication is representative of changes in communication quality levels. For example, if a significant deterioration in the quality of the radio link is indicated, the time-out of the retransmission timer is increased. In a packet data communications network implemented at least in part over a radio link, time-out values which are too low can cause spurious time-outs. This happens because of the additional time taken to perform retransmission over the radio link, under the control of a radio link control layer, for example. As previously explained, this results in decreased throughput as congestion control procedures are started, but performance of such procedures is in vain. In a situation in which real congestion of the core network exists, the mobile host does not use an excessively large window.

In one implementation, improved TCP flow control is provided for a mobile host operable in an IP network. Improved throughput rates are made possible by determinations made at the mobile host of indications related to the TCP communications upon a radio link forming a portion of the communication path between the mobile host and a network host (or any sending TCP station). Link layer status information at a radio link control layer which specifically provides information about the radio-link is used to optimize communications.

Throughput and link status data is used to set an optimal TCP offered window size. And, such data is also used to improve the ability of the retransmission timers of the mobile host to react to changes in the link status or in available bandwidth. In one embodiment, all necessary determinations and selections required for operation of the embodiment of the present invention are effectuated at the mobile host.

In a further implementation, apparatus is provided for a UMTS mobile terminal to optimize better TCP protocols to account for flow and congestion characteristics of wireless communication links. In contrast to conventional TCP flow and congestion control measures, which are specifically designed for fixed networks, operation of an embodiment of the present invention takes into account radio-link characteristics to optimize TCP transmission parameters. Data throughput and radio-link status indications, e.g., from a UMTS protocol stack, are used to set an optimal TCP window size. And, the data throughput and radio-link status indications are also used to improve the ability of TCP retransmission timers of the mobile terminal to react to changes in the link status or in available bandwidth. Implementation of the various embodiments of the present invention can be effectuated entirely at the mobile terminal, thus requiring no changes to fixed network elements, such as IP routers or network terminals.

In these and other aspects, therefore, apparatus, and an associated method, is provided for a first host operable in a communication system in which packet data is communicated between the first host and a second host upon a communication path in which the communication path includes a radio-link. The apparatus, and associated method, selects an optimal window size within which to transmit a data packet. A radio-link status determiner is coupled to receive indications of the radio-link forming a portion of the communication path between the first host and the second host. The radio-link status determiner determines an indication of a characteristic of the radio-link. The radio-link status determiner also generates a radio-link status indication indicative of the indication of the characteristic determined thereat. An optimal window size selector is coupled to receive the radio-link status indication generated by the radio-link status determiner. The optimal window size selector selects an optimal window size within which to transmit the data packet.

In these and other aspects, apparatus, and an associated method, are also provided for a communication system in which packet data is communicated between a first host and a second host upon a communication path. The communication path includes a radio-link, and the first host has a retransmission timer at least for selecting when to retransmit the data packet. Selection is made of a time-out value of a retransmission timer. A radio-link status determiner is coupled to receive indications of the radio-link forming a portion of the communication path between the first host and the second host. The radio-link status determiner determines an indication of radio-link quality of the radio-link. The radio-link status determiner also generates a radio-link quality indication indicative of the indication of the radio-link quality determined thereat. A retransmission timer time-out value selector is coupled to receive a value representative of the radio-link quality indication generated by the radio-link status determiner. The retransmission timer time-out value selector selects a time-out value of the retransmission timer. Selection is made responsive to the value representative of the radio-link quality indication.

A more complete appreciation of the present invention and the scope thereof can be obtained from the accompanying drawings, which are briefly summarized below, the following description of the presently-preferred embodiments of the invention, and the appended claims:

DETAILED DESCRIPTION OF THE PREFERRED EMBODIMENT

Figure 1:
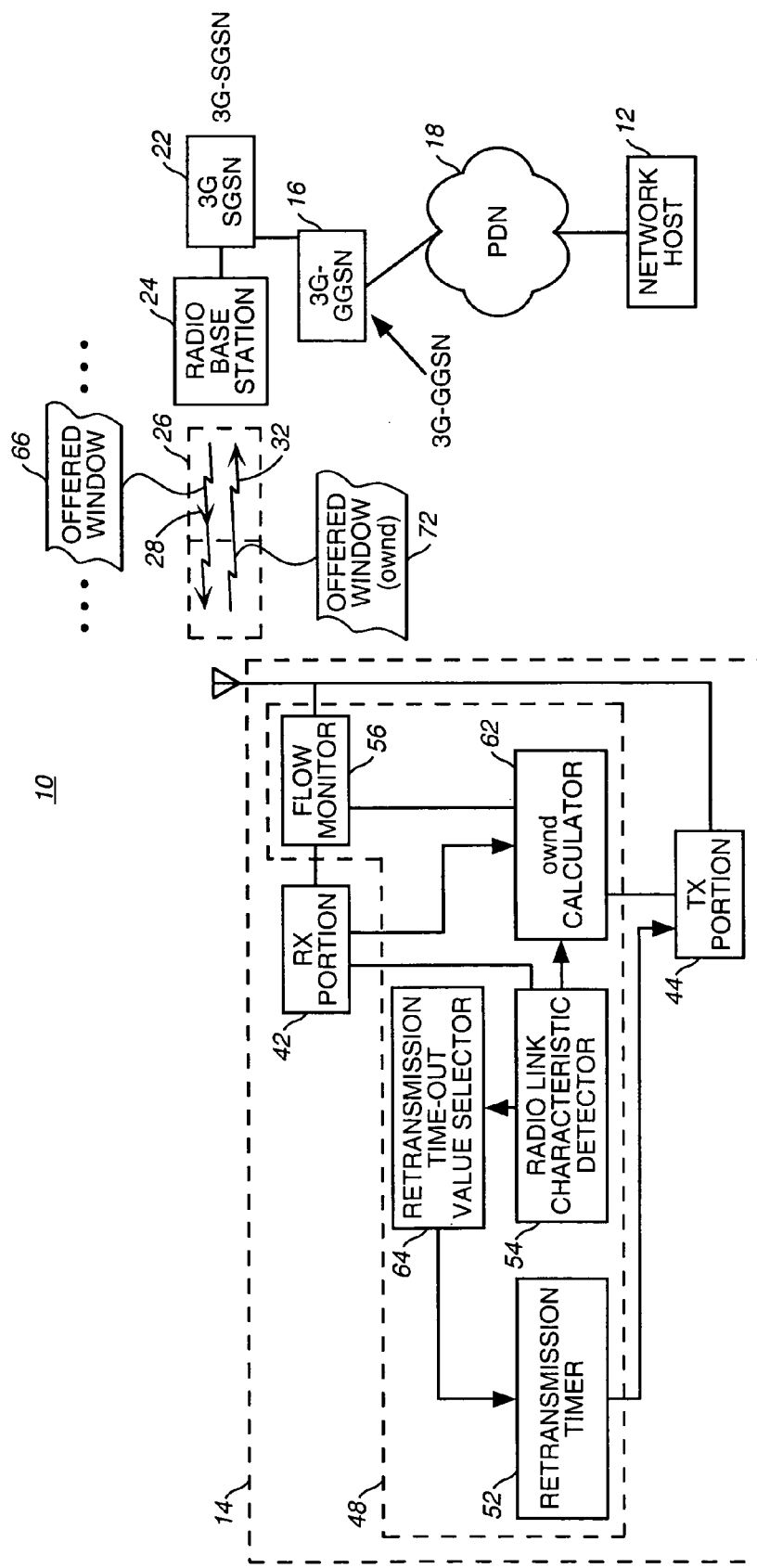
FIG. 1 illustrates a functional block diagram of a packet communication system including a mobile host operable pursuant to an embodiment of the present invention.

Referring first to FIG. 1, a packet communication system, shown generally at 10, provides for the communication of packet data between a sending station and a receiving station. For purposes of illustration and to describe operation of an embodiment of the present invention, a network host 12 and a mobile host 14 form stations between which packet data is communicated. While the network host 12, in the exemplary illustration of the Figure, is a wireline device, implementation of the network host as a mobile device could alternately be represented. And, while the exemplary implementation shall be described with respect to a network in which the TCP (Transmission Control Protocol) is employed and TCP/IP-formatted data packets are communicated between the network and mobile hosts 12 and 14, other systems can analogously be represented.

Control of when a data packet is transmitted is effectuated during operation of an embodiment of the present invention by taking into account characteristics of a radio-link which forms a portion of a communication path extending between the network and mobile hosts.

The communication system 10 includes network infrastructure, here shown to be formed of an IP-based wireline UMTS (Universal Mobile GPRS Telecommunications System) core network, including a 3G-GGSN (3G-GPRS Support Node) 16. The 3G-GGSN 16 is coupled to the network host 12 by way of a packet data network (PDN) 18. The 3G-GGSN is further coupled to a 3G-SGSN (3G Serving GPR5 Support Node) 22. And, the 3G-SGSN is coupled to a radio base station 24. A communication path, here of a wireline nature, extends between the network host and the base station 24 by way of the packet data network, the 3G-GGSN 16, and the 3G-SGSN 22.

A radio-link 26 having both "forward" or "down" link 28 and a "reverse" or "up" link 32 couples the mobile host 14 with the base station 24. The radio-link 26 also forms a portion of the communication path extending between the network and mobile hosts 12 and 14. Other logical structure of the network infrastructure of the system, such as location registers and other nodes are not shown for purposes of simplicity.

The illustrated portions of the communication system, however, illustrate the communication path formed between the network and mobile hosts to include both a wireline core network and a radio part. Operation of an embodiment of the present invention takes into account the character of the radio-link in controlling flow characteristics of data packets between the network and mobile hosts and also the properties of the fixed line part. In the event of congestion within the fixed-line IP network, normal TCP retransmission is effectuated.

The mobile host 14 includes both a receiver portion 42 and a transmitter portion 44. The receiver portion 42 is operable to act upon data packets received at the mobile host. The transmitter portion 44 is operable to transmit acknowledgments to acknowledge receipt at the mobile host of data packets communicated to the mobile host and also to transmit data packets generated by the mobile host.

The mobile host further includes a controller 48 operable to control operation of the receiver and transmitter portions of the mobile host. The controller includes functional elements of an embodiment of the present invention to select an optimal transmission window size within which the network host communicates data packets to the mobile host.

A retransmission timer 52 functionally represents a timer used to time the transmission of data during communication of packet data in the communication system 10. The controller further includes a radio-link characteristic detector 54, here coupled to the receiver portion to receive indications of communication characteristics of the radio-link. The radio-link characteristic detector is operable to determine characteristics of the radio-link therefrom. The controller further includes a flow monitor 56 for monitoring data throughput flows, either on the downlink or uplink paths. The controller also includes an OWND (Optimal Window) calculator 62 coupled to receive indications of determinations made by the radio-link characteristic detector 54. The OWND calculator is operable to calculate an optimal transmission window size for a transmission window within which data packets are to be communicated by the network host to the mobile host. And, the controller further includes a retransmission timer time-out value selector 64, also coupled to the radio-link characteristic detector 54. The retransmission time-out value selector is further coupled to the retransmission timer 52 and is operable to select the time-out value pursuant to which the retransmission timer is operable.

During operation of an embodiment of the present invention, packet data generated by the network host 12 is communicated by way of the communication path to the mobile host 14. Messages communicated to the mobile host include an offered window value, shown at 66, forming a portion of a message communicated to the mobile host. The offered window field is a field of a standard TCP header. In the exemplary implementation, the contents of the offered window field 72 sent from the mobile host to the network host are affected. The flow monitor 56 is operable to provide an indication of data flow rate to the OWND calculator 62. In one implementation, the OWND calculator calculates an optimal window size responsive to the data throughput rates detected by the flow monitor 56. In a further implementation, the OWND calculator is further operable responsive to detections made by the radio-link characteristic detector 54 in the determination of the optimal transmission window size. Values representative of the calculations performed by the calculator 62 are provided to the transmitter portion 44 which formats the values into an offered window field 72 of a message communicated by the mobile host to the network host. When received by the network host, the value contained in the offered window field 72 forms a maximum transmission window size within which the network host subsequently transmits data packets to the mobile host. The mobile host itself may also adopt the same maximum window size for its own transmissions of packet data to the network host.

During operation of a further embodiment of the present invention, responsive to detections made by the radio-link characteristic detector 54, the retransmission time-out value selector 64 is selectively operable to alter operation of the retransmission timer 52. In the event that a significant change in the radio-link characteristics is detected, the time-out value of the retransmission timer is adjusted. When deterioration of the quality of the radio-link in excess of a selected amount is detected, the retransmission timers are prolonged thereby to avoid spurious retransmission due to deterioration of radio-link conditions. Advantageously, the transmission timers of packets that have already been transmitted (but not acknowledged) are prolonged, as are the timers for subsequently transmitted packets.

Figure 2A:
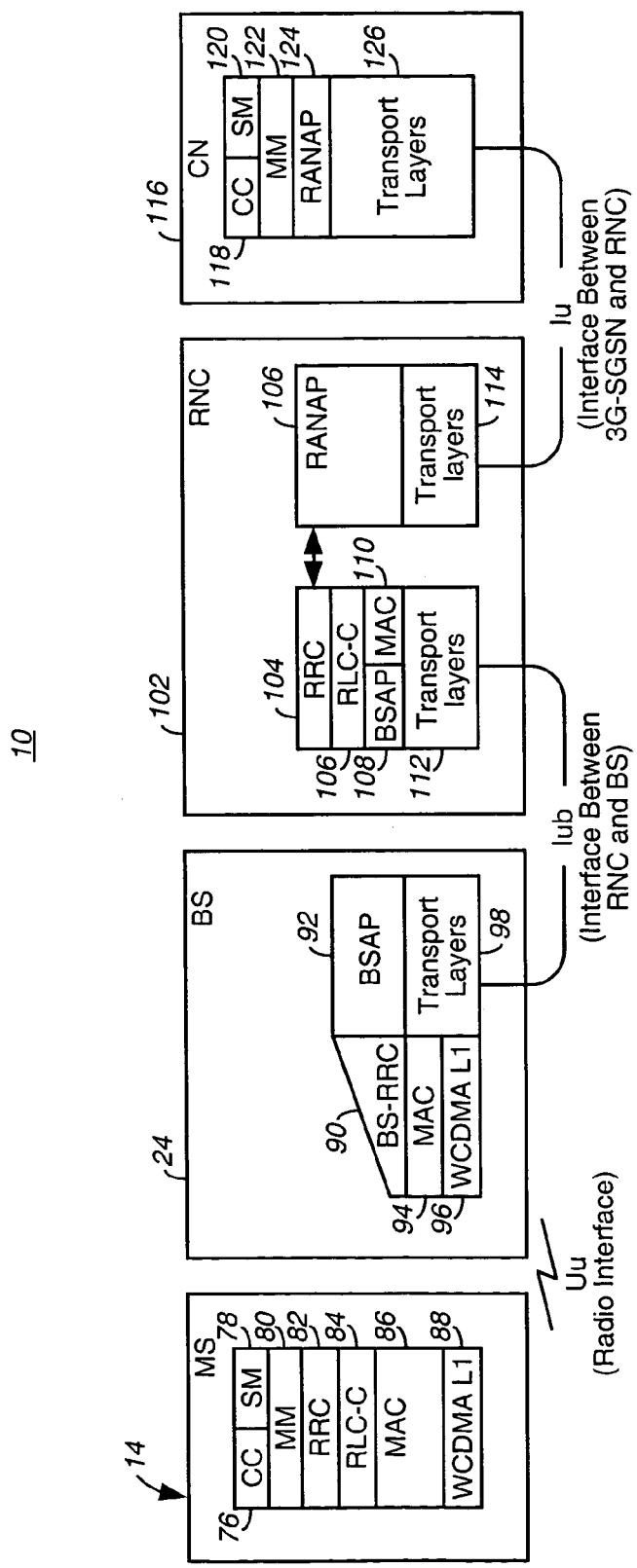
FIG. 2A and 2B illustrate logical layer diagrams illustrating the logical layers of the control and user planes, respectively, of the packet communication system shown in FIG. 1.
Figure 2B:
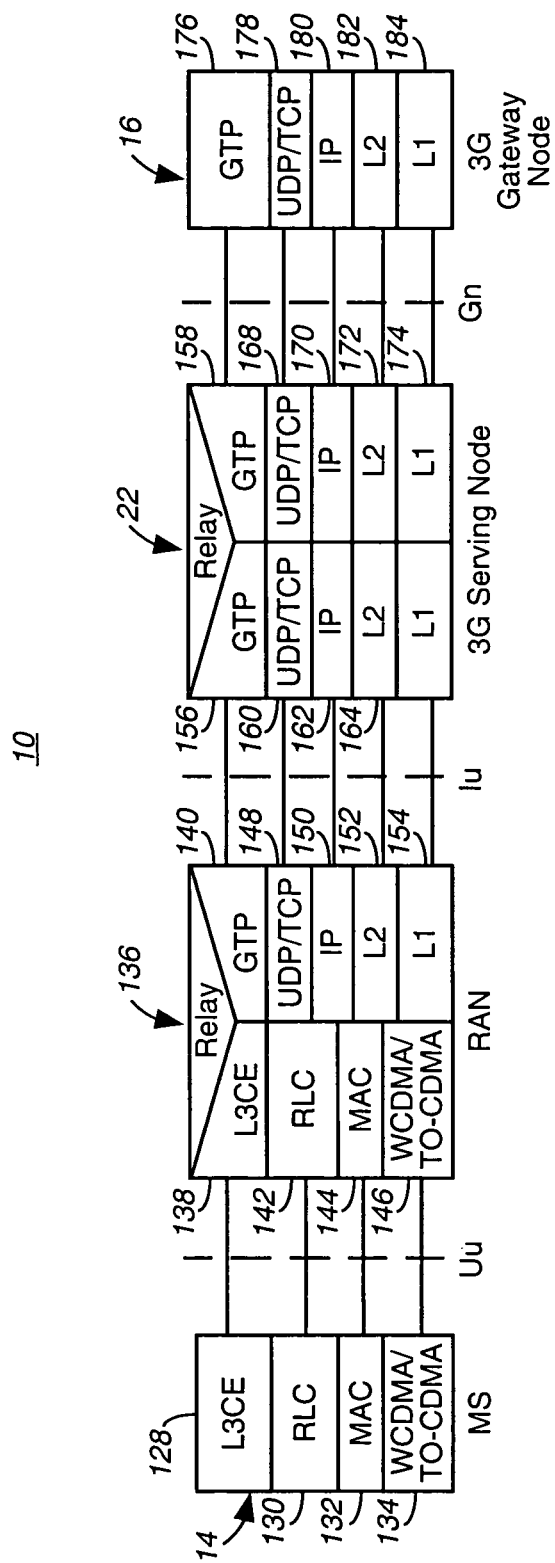

Turning next to FIGS. 2A and 2B, the communication system 10, shown previously in FIG. 1, is again shown, here in logical layer form. The logical layers of the mobile host 14 are illustrated at the left-most portion of the Figure (as shown) and, the network portion of the communication system is illustrated at the right-most (as shown) portion of the Figure. FIG. 2A illustrates the control plane protocols and FIG. 2B illustrates the user plane protocols of the communication system. The logical layers are exemplary of the logical construction proposed for the UMTS system. Other systems can analogously be represented.

In the control plane protocol representation shown in FIG. 2A, the mobile host (MS) 14 is shown to include CC (call control) and SM (session management) layers 76 and 78 which reside upon an MM (mobility management) layer 80. The MM layer resides upon an RRC (radio resource control) layer 82 which, in turn, resides upon an RLC-C (radio link control) layer 84. The layer 84 resides upon the MAC (medium access control) layer 86 which resides upon the WCDMA (wideband code division multiple access) L1 layer 88.

A radio-link indicated by Uu is formed between the mobile host 14 and the radio base station 24. The base station is shown to include a BS-RRC (radio resource control) layer 90 and BSAP (base station application part) layer 92. The BS-RRC layer 90 resides upon the MAC layer 94 which, in turn, resides upon the WCDMA L1 layer 96. And, the BSAP layer 92 is shown to reside upon the transport layer 98. The network also includes an RNC (radio network controlloer) 102, here shown to include an RRC layer 104 and an RANAP (radio access node application part) layer 106. The RRC layer 104 resides upon the RLC-C layer 106, which in turn, resides upon the BSAP and MAC layers 108 and 110 respectively. The layers 108 and 110, in turn, reside upon transport layers 112. And, the RANAP layer 106 resides upon transport layers 114.

The network further is shown to include a CN (core network) 116, here shown to include CC and SM layers 118 and 120, corresponding to the layers 76 and 78 of the mobile host. The layers 118 and 120 reside upon the MM layer 122 which, in turn, resides upon the RANAP layer 124. And, the RANAP layer 124 resides upon transport layers 126.

In the user plane representation of FIG. 2B, the mobile host 14 is shown to include an L3CE (layer 3 compatibility) layer 128, alternatively known as a PDCP (packet data convergence protocol layer) residing upon an RLC layer 130 which, in turn, resides upon the MAC layer 132. The MAC layer resides upon a WCDMA/TD/CDMA layer 134. A radio link, represented by Uu, is formed between the mobile host 14 and an RAN (radio access node) 136. The RAN 136 is shown to include L3CE and GTP (GPRS tunnelling protocol) layers 138 and 140. The layer 138 resides upon an RLC layer 142 which, in turn, resides upon an MAC layer 144. The layer 144 resides upon the WCDMA/TD/CDMA layer 146. And, the GTP layer 140 resides upon the UDP/TCP (user datagram protocol/transport control protocol) layer 148. Layer 148 resides upon an IP (internet protocol) layer 150 which, in turn, resides upon a second-level layer L2, 152, and an L1 layer 154.

The network here further shows the logical layers of the 3G-SGSN 22. The node 22 is here shown to include GTP layers 156 and 158. The layer 156 resides upon a UDP/TCP layer 160 which, in turn, resides upon an IP layer 162. The IP layer resides upon an L2 layer 164 and, in turn, upon an L1 layer 166. Analogously, the GTP layer 158 resides upon a UDP/TCP layer 168, which, in turn, resides upon the IP layer 170. The IP layer 170 resides upon an L2 layer 172 and, in turn, upon an L1 layer 174.

FIG. 2B further shows the 3G-SGSN gateway node 16. Here, the node 16 is shown to include a GTP layer 176 which resides upon a UDP/TCP layer 178. The layer 178 resides upon an IP layer 180 which, in turn, resides upon an L2 layer 182, and in turn, upon an L1 layer 184. It should be noted that, in operation of an embodiment of the present invention, the end-to-end TCP layer is modified rather than the TCP/UDP layer of the core UMTS layer.

Link layer status information is utilized, as noted above, better to optimize packet data communication using TCP. In a first embodiment of the present invention, throughput and link status data available from the UMTS protocol stack, i.e., the layering of data protocols as illustrated in FIGS. 2A-B, is used to set an optimal TCP offered window size.

The mobile host 14 forms a TCP host. During operation of this embodiment, the mobile host is enabled to limit the packet transmission rate of the network host 12 responsive to determinations of the throughput at the radio-link which forms a portion of the communication path between the mobile host 14 and the network host 12. Determination of throughput is conducted on the basis of information obtained from the RLC layers and/or L3CE layers, as appropriate. Control is effectuated over data transmission by the network host 12 to the mobile host 14. Of course, any layer providing such information could be used in theory.

More particularly, the optimal size of a TCP transmission window is selected at the mobile host according to radio-link status information. The selected optimal size, the OWND, is indicated in the offered window field, also known as the advertised window field, in TCP acknowledgments which are returned to the network host. The network host utilizes the OWND to define a maximum size of a transmission window within which to transmit a subsequent data packet. Unnecessary congestion and packet losses are avoided as the OWND is chosen according to the wireless link, typically the slowest link in the communication path formed between the network host and mobile host.

The OWND is defined at the mobile host according to information at a UMTS data flow monitor, or QoS (quality of service) monitor. While not separately shown in FIGS. 2A and 2B, the monitor is also part of the data protocol stack and is able to give information about the condition of the UMTS network to applications running in the system. Selection of the OWND is, in one implementation, further responsive to an estimation of the radio-link status. The status of the radio link is estimated by measuring round trip-times (RTTs). The term RTT refers in general to the time interval between sending a data packet and receiving an acknowledgment to the sending of the packet. In an embodiment of the present invention, the round trip time $RTT_{L3CE}$ associated with sending a data packet between the L3CE layers of the mobile host and the radio access network is measured. When radio-link quality deteriorates, or available bandwidth in the radio network decreases, this time period typically increases. Thus, changes in $RTT_{L3CE}$ can be used to estimate the amount of time used in performing retransmissions over the radio-link. In the event that the L3CE layer does not provide acknowledgments and $RTT_{L3CE}$ cannot therefore be measured, the RLC RTT ($RTT_{RLC}$), or another suitable round trip time can be utilized instead. The TCP layer at the mobile host also collects user data throughput information provided by a UMTS flow monitor. The receiving TCP layer further utilizes a conventional, standardized mechanism to estimate the overall end-to-end round trip time at the TCP layer.

Thus, according to an embodiment of the invention, the TCP layer transmission rate of the network host is limited responsive to the radio-link status. The rate is limited responsive to calculations of an optimal window size, OWND, at the mobile host by utilizing data throughput information, information related to the time consumed by retransmissions over the radio link estimated by a L3CE-RTT monitor, and RTTs that the TCP layer estimates. The calculated OWND is inserted into the offered window field of TCP acknowledgments sent from the mobile host back to the network host. In the exemplary implementation, calculations are performed at the mobile host and actual limiting of the data transfer rate is performed at the network host. In other implementations, operation in other manners can be effectuated.

In normal operating conditions, e.g., including operating conditions in which throughput in the radio-link is well matched to that required by the fixed TCP/IP network, retransmission according to the standard TCP retransmission protocol maintains protection against packet losses due to congestion in the fixed part of the network.

According to the invention, when a significant change in data throughput is detected, an algorithm is executed according to an exemplary embodiment (at the mobile host) to estimate a new value of the OWND. Alternatively, the OWND is regularly calculated and added to an offered window field.

An equation utilized by which to estimate the OWND is as follows:

$$\text{ownd} = \text{Throughput} * RTT \quad (1)$$

wherein:
OWND is the optimal window size of a transmission window, as calculated at the mobile host;
throughput is the measured data flow rate; and
RTT is a round-trip-time, as defined below.

In the exemplary implementation, the flow monitor, or QoS monitor, monitors throughput in each of the forward and reverse link directions at the L3CE logical layer. And, estimation of the data flow rate towards the mobile host 14 is used as the value of the throughput in the just-listed equation.

The RTT estimate, used above, is calculated according to the following equation:

$$RTT = RTT_{TCP} - (RTT_{L3CE} - RTT_{OPT}) \quad (2)$$

wherein:
$RTT_{TCP}$ is an end-to-end round-trip-time calculated utilizing standard TCP mechanisms;
$RTT_{L3CE}$ is a round-trip time at the L3CE logical layer.
$RTT_{OPT}$ is an optimal round-trip-time over the radio-link, i.e., at the L3CE layer.

It should be appreciated from this second equation that RTT provides an estimate of the end-to-end round-trip time minus the time spent in performing retransmission over the radio link. It should also be appreciated that any logical layer which provides acknowledgments for data packets transmitted over a radio link could be used to provide the required estimates of round trip times over the air interface.

Following is the manner, in the exemplary implementation, by which the $RTT_{L3CE}$ is measured. When a mobile host is sending an IP packet, the packet is offered to the L3CE layer 128. At such layer, the packet is forwarded to lower layers upon which the L3CE layer resides. At the lower layers, the packet is divided into smaller segments which are transmitted over a radio-link. If corruption occurs, the segments are retransmitted. Once the entire L3CE packet is successfully transmitted, the L3CE layer at the mobile host is informed by an acknowledgment message transmitted from the receiving host, e.g., a network. element of the radio access network. The mobile host is then able to calculate the $RTT_{L3CE}$ by measuring the time interval between the transmission time of L3CE packets and the arrival time of acknowledgments thereto. The mobile host, could, for example, maintain a table pertaining to recently transmitted L3CE packets. When a segment is passed to a lower layer, the flow to which the packet belongs is identified, e.g., either by a flow ID, or, an IP destination and source address. The TCP destination and source ports and the protocol field, a sequence number and transmission timer is marked in the table. When acknowledgment of the packet is passed from the lower layers to the L3CE layer, the arrival time of the acknowledgment is marked in the table. The segment corresponding to the arrived acknowledgment can then be recognized from the flow ID and the sequence number. The time difference between such markings on the table is the $RTT_{L3CE}$ value. In an implementation in which the L3CE layer does not make acknowledgments, the RLC layer effectuates the acknowledgments. In any event RTT over RAN is measurable at least at one of the layers.

The $RTT_{L3CE}$ value calculated as such, cannot be used to estimate the optimal window size, OWND, as only the time spent in retransmissions over the radio-link should be subtracted from the overall TCP round-trip-time $RTT_{TCP}$. As a result, $RTT_{OPT}$, which describes the L3CE layer round-trip time in optimal circumstances, i.e., exclusive of bit errors and retransmissions, must first be subtracted from the value of $RTT_{L3CE}$. $RTT_{OPT}$ can be determined by utilizing information that a WCDMA-RLC/MAC layer provides. The RLC/MAC layer, for instance, measures RLC layer round-trip time, which is then used in RLC layer for control. The same information, i.e., RLC layer RTT, can alternately be utilized to calculate the $RTT_{OPT}$ value needed. In another implementation, the value of $RTT_{OPT}$ is determined experimentally at different bandwidths and such experimentally determined values are stored in the mobile host for use in round-trip-time calculations.

The optimal transmission window size, OWND, is then calculated utilizing radio-link status data. The new value of the OWND is then added to an offered window field in a subsequent TCP acknowledgment, or data packet sent from the mobile host to the network host. A network host running in a normal standard TCP protocol handles OWND as it handles normal offered window indications. The network host utilizes OWND as the maximum value for its transmission window. Therefore, there is no need to modify the TCP/IP stack at the network host.

TCP flow control is further effectuated by controlling the manner, and when, TCP retransmission timers are adjusted. In the TCP specification, retransmission timer management is governed according to the following equations:

$$E = RTT_M - RTT_A$$

$$RTT_A \leftarrow RTT_A + gE \qquad (3)$$

$$D \leftarrow D + h(abs(E) - D)$$

$$RTO = RTT_A + 4D$$

wherein:
$RTT_M$ is a most recent RTT measurement;
$RTT_A$ is a smoothed estimator or RTT average;
D is a smoothed mean deviation;
RTO is a value of a retransmission timer; and
h and g are constants of values of 0.25 and 0.125, respectively.

In this embodiment, radio-link status information is utilized to identify significant changes in throughput or link quality, and therefrom to adjust the retransmission timers to avoid spurious time-outs and subsequent retransmissions. As a result, additional time is provided for standard TCP retransmission timer adjustment, allowing the timer management to settle down to a newly adjusted value. According to an embodiment of the present invention, a value of $RTT_{l3CE}$ is measured for each data packet or segment. When such significant increments in the measured values of round-trip-times (i.e. $RTT_{L3CE}$) are detected, information about the change in the values is passed on to a TCP layer. The RTO, above-defined, of each TCP packet currently on-transmission is prolonged thereby to avoid spurious retransmissions. Spurious TCP retransmissions are decreased in situations in which the mobile host sends data and either the available bandwidth over the radio-link or the radio-link quality deteriorates significantly. Link layer status information is utilized in the timer adjustment. When deterioration is detected, the TCP retransmission timer values are prolonged. Advantageously, this is done both to the TCP packets that have already been transmitted and the timer is currently running as well as to at least subsequent packet to be next transmitted. In this manner, the network has more time to effectuate retransmissions at the lower layers, (e.g., the RLC layers) prior to timing out of the TCP timers, resulting in retransmissions of TCP packets. It should be noted that prolonging an RTO does not affect RTT estimations. The timers may also be extended for one or more packets still remaining to be transmitted.

An $RTT_{L3CE}$ estimation table, described above, is also utilized to detect changes in the radio-link. When the quality of the link or radio resource available for the TCP flow decreases, values of the $RTT_{L3CE}$ estimations increase. As the table includes history information of $RTT_{L3CE}$ measurements such changes are detectable. The difference, between, for instance, the two most-recent $RTT_{L3CE}$ measurements is the time interval used in connection with retransmission timer adjustment.

When the mobile host is about to send a TCP data packet, the $RTT_{L3CE}$ table is accessed to determine whether there has been a significant change between the latest measurements of the TCP data flow. If there has not been a significant change, the TCP sets the retransmission timer in a conventional manner. If, however, the status of the radio-link has changed, the difference between the latest $RTT_{L3CE}$ measurements of that specific data flow, $T_D$ is calculated and added to the TCP retransmission timer for the data flow in question.

The significance of changes between successive measurements of TCP data flow can be determined, e.g., by measuring a deviation D in the previously determined $RTT_{TCP}$ values, which may be calculated as shown in the previous equations. If $T_D$ is greater than, e.g., 4D, a significant change is defined, and the TCP timers are prolonged. Examination of the effect of different choices on the number of spurious TCP retransmissions under given conditions might result in a selection of another threshold value, defining the significance of changes in TCP data flow.

$T_D$ is also added to the timers of the TCP packets that have already been transmitted. To do so, the TCP implementation must be such that if the retransmission timer times-out, retransmission of TCP packets is not performed unconditionally. Instead, a check is made to see whether there is a need to prolong the timer. If there is, a new timer with a value $T_D$ is started and, if this timer also times-out, a normal standardized retransmission procedure is effectuated. In the event that there is no need to prolong the original timer, a normal retransmission procedure is performed subsequent to expiration of the timer.

Advantageously, when a significant change in $T_D$ is detected, the timers of the packet to be transmitted subsequently and also N following packets are prolonged. To determine an appropriate value of N the constants h and g in the preceding equations can be used. Conventionally, such constants determine the effect of the most recent measurements of RTT and deviation D on the value of RTO. Consequently, according to an embodiment of the invention, N is chosen so that after N segments, the normal RTO estimation procedure has enough time to settle down to the new value and timers need not be prolonged by $T_D$ anymore. A proper value of N can, for instance, be experimentally determined, such as by setting N to 1/h.

Figure 3:
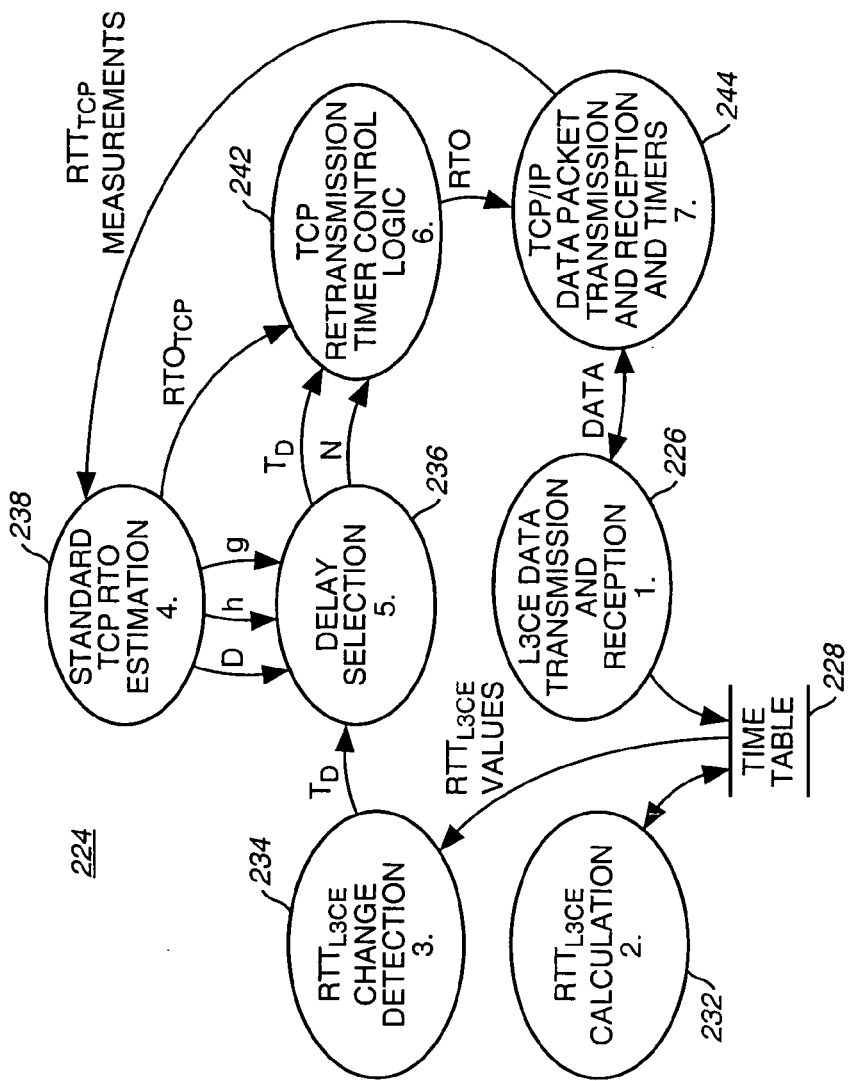
FIG. 3 illustrates a functional representation of a flow diagram representative of an embodiment of the present invention.

FIG. 3 illustrates a flow diagram, shown generally at 224, representing the manner by which retransmission timers are adjusted during operation of an embodiment of the present invention. Advantageously, and as previously explained, all operations illustrated in the flow diagram are performed at a mobile host, which is assumed to be taking part in packet data communication over a radio link with e.g. a network host in the fixed line part of a telecommunications network. Furthermore, the steps of the method described by the states of the flow diagram are performed advantageously for each active data flow between the mobile host and the network host.

A first block 226 represents the transmission and reception of data at a L3CE layer. Alternatively, if the L3CE layer does not provide a mechanism by which acknowledgments are provided for transmitted data, another layer, for example an RLC layer, that does provide acknowledgments can be used. When a data packet is transmitted from the mobile host to the network host, the packet transmission time is marked in a time table 228. An indication of the data flow to which the packet belongs is also provided in the table. This indication can take the form of a corresponding flow ID, or alternatively IP addresses, TCP port numbers and protocol ID, or any other indication that uniquely identifies the data flow to which the packet belongs. The operation of marking the packet transmission time and corresponding flow ID in the time table is represented by the path taken from the transmission and reception block 226 to time table 228. When a corresponding acknowledgment for the packet is received from the network host, the time of arrival of that acknowledgment is also marked in the time table 228.

Paths are also taken from time table 228 to an $RTT_{L3Ce}$ calculation block 232 and to an $RTT_{L3CE}$ change detection block 234. To estimate L3CE round trip time $RTT_{L3CE}$, the time table is accessed to read transmission and reception times recorded therein. In block 232 the round trip time at the L3CE layer is determined and the result of the calculation is entered into the time table, as indicated by the arrow directed from state 232 to time table 228.

In order to detect the change in the $RTT_{L3CE}$, the time table is accessed and the latest $RTT_{L3CE}$ values are collected. The change in $RTT_{L3CE}$ between, for example, the most recent $RTT_{L3CE}$ values, is determined in block 234. The change $T_D$ is passed forward to a delay selection block 236. In addition to the value of $T_D$, delay selection block 236 receives input from a conventional TCP retransmission timer (RTO) estimation block 238. The values of D, g and h, defined according to equation set 3, used in conventional TCP retransmission timer adjustment, are passed to delay selection block 236. Input relating to TCP layer round trip time measurements is also received by block 238 from block 244 (described later) for use in estimation of the standard TCP RTT value.

In delay selection block 236 the values of $T_D$ and D are used to determine if the change in $RTT_{L3CE}$ is significant, in other words, whether there is a need to prolong the TCP retransmission timers. If it is determined that re-adjustment is necessary, the subsequent number of TCP packets to be affected by the change, i.e., N is determined using g and/or h and $T_D$. The values of N and $T_D$ are passed forward to a TCP retransmission timer control block 242.

TCP retransmission timer control block 242 also receives input from the standard TCP RTO estimation block 238, indicating the value of the $RTO_{TCP}$ calculated using the conventional TCP retransmission timer calculation logic. TCP retransmission timer control logic in block 242 controls the retransmission timers. If timer re-adjustment is necessary, the timer control logic re-adjusts timers that are currently running by calculating a new prolonged retransmission timer value and passing that forward to TCP/IP data packet transmission and reception and timers block 244. The value of a retransmission timer RTO to be used for subsequent data packets is also determined in block 242 by adding the value of $T_D$ received from delay selection block 236 to the value of $RTO_{TCP}$ received from the standard TCP RTO estimation block 238. This new value of RTO is applied to the following N data packets, as indicated by the value of N received from delay selection block 236. If there is no need for retransmission timer re-adjustment, the standard TCP RTO value obtained from block 238 is utilized.

In the TCP/IP data packet transmission and reception and timers block 244 data is exchanged with the L3CE data transmission and reception block 226. In the functional state represented by the block 226, retransmission timers whose values are controlled by block 244 are used for currently proceeding and subsequent data packet transmissions. In order to enable the adjustment of currently running retransmission timers in accordance with the method of the invention, the retransmission timer implementation is such that if there is found to be a need to prolong a running timer, a new timer is started immediately after expiration of the running timer. In this way a timer that is already running may be effectively extended in accordance with the RTO value provided by state 244. TCP layer round trip time measurements are also passed from block 244 to block 238 for use in the standard RTO estimation.

Figure 4:
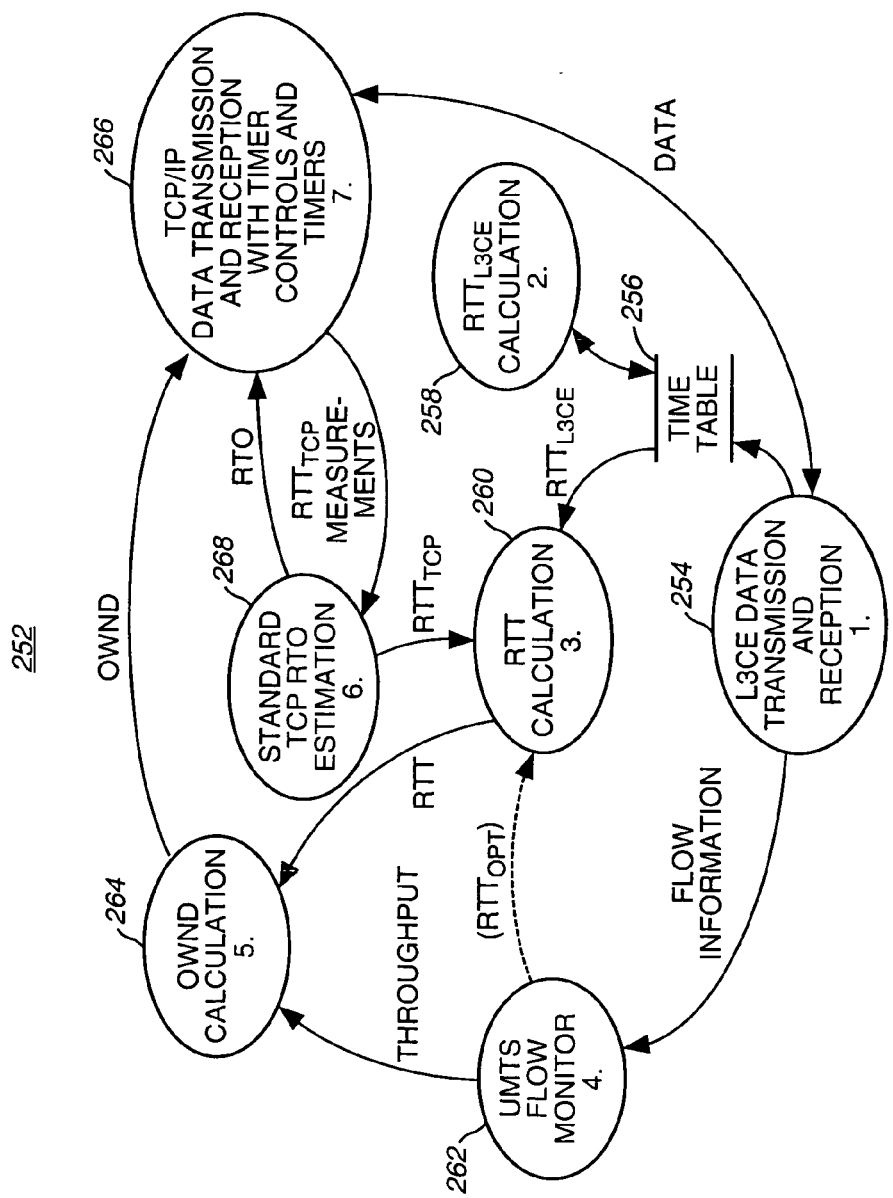
FIG. 4 illustrates a functional representation of a flow diagram representative of another embodiment of the present invention.

FIG. 4 illustrates a flow diagram, shown generally at 252, representing the manner by which to estimate an optimal window value OWND for a TCP offered window during operation of an embodiment of the present invention. Advantageously, and as previously explained, all operations illustrated in the flow diagram are performed at a mobile host, which is assumed to be taking part in packet data communication over a radio link with e.g. a network host in the fixed line part of a telecommunications network. Furthermore, the steps of the method described by the flow diagram are performed advantageously for each active data flow between the mobile host and the network host.

A first block 254 represents the transmission and reception of data at an L3CE layer. Alternatively, if the L3CE layer does not provide a mechanism by which acknowledgments are provided for transmitted data, another layer, for example an RLC layer, that does provide acknowledgments can be used. When a data packet is transmitted from the mobile host to the network host, the packet transmission time is marked in a time table 256. An indication of the data flow to which the packet belongs is also provided in the table. This indication can take the form of a corresponding flow ID, or alternatively IP addresses, TCP port numbers and protocol ID, or any other indication that uniquely identifies the data flow to which the packet belongs. The operation of marking the packet transmission time and corresponding flow ID in the time table is represented by the path taken from the transmission and reception block 254 to time table 256. When a corresponding acknowledgment for the packet is received from the network host, the time of arrival of that acknowledgment is also marked in the time table 256.

Round trip times at the L3CE layer are calculated at $RTT_{L3CE}$ calculation block 258. To estimate $RTT_{L3CE}$, time table 256 is accessed to read the transmission and reception times recorded therein. $RTTL_{L3CE}$ is determined at block 258 and the result of the calculation is entered into the time table, as indicated by the arrow directed from block 258 to time table 256.

At RTT calculation block 260, an estimate of the round trip time RTT is obtained, preferably according to the expression presented earlier. As explained previously, according to this equation, RTT is defined so as to represent an estimate of the end-to-end round trip time minus the amount of time spent in performing retransmissions over the radio link that forms at least part of the communication path. In order to calculate RTT, RTT calculation block 260 uses values relating to round trip time at the L3CE layer ($RTT_{L3CE}$) obtained from time table 256 and an estimate of end-to-end round trip time, i.e. $RTT_{TCP}$, from a standard TCP RTO estimation block 268 (described below). In order to perform calculation of RTT according to the exemplary embodiment of the invention, RTT calculation block 250 further receives an estimate of the optimum round trip time over the radio link $RTT_{OPT}$ provided by a UMTS flow monitor, denoted by block 262 in FIG. 4. The transfer of information concerning $RTT_{OPT}$ from UMTS flow monitor 262 to RTT calculation block 260 is represented by a dotted line in order to indicate that in some implementations UMTS flow monitor 262 may not be able to provide indications of the radio link status and is therefore unable to provide information about $RTT_{OPT}$. In this case, and as previously described, alternative methods for providing information about $RTT_{OPT}$ can be used. For example, values of $RTT_{OPT}$ at different bandwidths determined experimentally and stored in the mobile host can be used in the calculation of RTT. However, in the remainder of this description, it will be assumed that information relating to $RTT_{OPT}$ is provided by the UMTS flow monitor and is available for use in determination of RTT.

An optimal value for the size OWND of a transmission window to be used at least in transmissions from the network host to the mobile host is calculated at OWND calculation block 264 using input regarding L3CE layer throughput obtained from UMTS flow monitor 262 and the value of RTT obtained from RTT calculation block 260. The resulting OWND size is passed to the TCP/IP transmission and reception block 266, which also includes timer and timer control functionality.

As shown in FIG. 4, a standard TCP RTO estimation block 268 is also provided to estimate TCP retransmission timer values in a conventional manner, for example according to Equation set 3. The TCP RTO estimation block 268 receives information concerning end-to-end round trip times (i.e., $RTT_{TCP}$) from TCP/IP transmission and reception block 266 for use in the calculation of retransmission timer value RTO. An RTO value calculated in block 268 is passed forward to TCP/IP transmission and reception block 266 where it is used to control TCP retransmission timers.

The TCP/IP transmission and reception block 266 further exchanges data with L3CE data transmission and reception block 254. The optimal transmission window size OWND is passed to L3CE data transmission block 254 where it is added to TCP packets or acknowledgments sent to the network host, for subsequent use by the network host as a maximum data transmission window size. Advantageously, the mobile host also uses the value of OWND as a maximum TCP transmission window size in its own transmissions to the network host.

Operation of an embodiment of the present invention permits improvement in packet communications upon a communication path including a radio-link. By taking into account the conditions of the radio-link to control data flow, congestion which might otherwise occur as a result of packet losses on the radio-link is reduced. An embodiment of the present invention is further implementable to effectuate mobile-to-mobile communication by way of a fixed, e.g., UMTS, network. The above-described apparatus and method, in such an implementation, is utilized at both radio-links extending to both of the mobile hosts.

The mechanisms described by the state diagrams of FIGS. 3 and 4 are advantageously used together to provide the best possible improvement in packet data communication. Of course, either one could be used separately. But, as they use the same information relating to the status of the radio link (i.e., the values $RTT_{L3CE}$ recorded in the time table, it seems that an embodiment of the present invention advantageously includes the use of both mechanisms in parallel.

The previous descriptions are of preferred examples for implementing the invention, and the scope of the invention should not necessarily be limited by this description. The scope of the present invention is defined by the following claims:

We claim:

1. An apparatus for controlling packet-based communication over a communication path between a mobile host and a network host, the apparatus comprising:
   a controller and associated logic that, when executed, causes the apparatus to:
   measure a packet-data throughput rate upon at least one of a forward link or a reverse link of a radio-link in a radio part of the communication path;
   estimate an amount of time spent in retransmission of packet data over the radio-link in the radio part of the communication path;
   measure an end-to-end round-trip time for packet-based communication over the communication path between the mobile host and the network host, said end-to-end round-trip time representing a total time taken for packet-based communication over the radio part of the communication path and a wire-line part of the communication path;
   calculate a modified end-to-end round-trip time for packet-based communication over the communication path between the mobile host and the network host by subtracting the estimated amount of time spent in retransmission of packet data over the radio-link from the measured end-to-end round trip time for packet-based communication; and
   calculate a transmission window size within which to transmit a data packet as a mathematical product of the measured packet-data throughput rate upon the at least one of the forward link or the reverse link of the radio-link, and the modified end-to-end round-trip time, thereby taking into account an effect of packet-data retransmission over the radio-link in calculating the transmission window size.

2. An apparatus according to claim 1, wherein the controller further comprises logic that, when executed, causes the apparatus to provide a value representative of the calculated transmission window size to a transmitter for communication to the network host.

3. An apparatus according to claim 1, wherein the controller further comprises logic that, when executed, causes the apparatus to estimate the amount of time spent in retransmission of packet data over the radio-link by:
    measuring a round-trip time for packet-data communication over the radio-link; and
    subtracting an optimal value of round-trip time over the radio-link that excludes bit-errors and retransmissions from the measured round-trip time for packet-data communication over the radio-link.

4. An apparatus according to claim 3, wherein the controller further comprises logic that, when executed, causes the apparatus to measure the round-trip time for packet-data communication over the radio-link by measuring a time interval between transmission of a data packet over the radio-link and receipt of an acknowledgement thereto provided by a predetermined protocol layer of the radio-link that provides acknowledgements for transmitted packets.

5. An apparatus according to claim 4, wherein the controller comprises logic that, when executed, causes the apparatus to measure the round-trip time for packet-data communication over the radio-link at an L3CE layer of a UMTS protocol stack.

6. An apparatus according to claim 1, wherein the controller further comprises logic that, when executed, causes the apparatus to adjust a time-out value of a retransmission timer used to determine when to retransmit a data packet.

7. An apparatus according to claim 6, wherein the controller further comprises logic that, when executed, causes the apparatus to increase the time-out value of the retransmission timer when changes in values of round-trip times over the radio-link exceed a multiple of a mean deviation.

8. An apparatus according to claim 6, wherein the controller further comprises logic that, when executed, causes the apparatus to increase the time-out value of the retransmission timer when more than a predetermined number of data packets are communicated upon the communication path without acknowledgement thereto.

9. An apparatus according to claim 6, wherein the controller further comprises logic that, when executed, causes the apparatus to increase the time-out value of the retransmission timer for a selected number of data packets that are subsequently to be retransmitted.

10. An apparatus according to claim 6, wherein the controller further comprises logic that, when executed, causes the apparatus to detect significant increments in round-trip time over the radio-link, and when a significant increment is detected, to prolong a retransmission time-out value for each data packet that has been transmitted and for which a retransmission timer is running, as well as to prolong a retransmission time-out value for one or more data packets remaining to be transmitted.

11. An apparatus according to claim 10, wherein the controller further comprises logic that, when executed, causes the apparatus to:
    measure a deviation in end-to-end round-trip times;
    measure a difference between most recent measurements of round-trip time over the radio-link; and
    detect the significant increment when the measured difference between the most recent measurements of round-trip time over the radio-link exceeds the deviation in end-to-end round-trip times by a predetermined threshold value.

12. An apparatus according to claim 1, wherein the apparatus is provided in a mobile terminal of a UMTS telecommunication system.

13. A method for controlling packet-based communication over a communication path between a network host and a mobile host, the method comprising:
    measuring a packet-data throughput rate upon at least one of a forward link or a reverse link of a radio-link in a radio part of the communication path;
    estimating an amount of time spent in retransmission of packet data over the radio-link in the radio part of the communication path;
    measuring an end-to-end round-trip time for packet-based communication over the communication path between the network host and the mobile host, said end-to-end round-trip time representing a total time for packet-based communication over the radio part of the communication path and a wire-line part of the communication path;
    calculating a modified end-to-end round-trip time for packet-based communication over the communication path between the network host and the mobile host by subtracting the estimated amount of time spent in retransmission of packet data over the radio-link from the measured end-to-end round trip time for packet-based communication; and
    calculating a transmission window size within which to transmit a data packet as a mathematical product of the measured packet-data throughput rate upon the at least one of the forward link or the reverse link of the radio-link, and the modified end-to-end round-trip time, thereby taking into account an effect of packet-data retransmission over the radio-link in calculating the transmission window size.

14. A method according to claim 13, wherein estimating the amount of time spent in retransmission of packet data over the radio-link comprises:
    measuring a round-trip time for packet-data communication over the radio-link; and
    subtracting an optimal value of round-trip time over the radio-link that excludes bit-errors and retransmissions from the measured round-trip time for packet-data communication over the radio-link.

15. A method according to claim 14, wherein measuring the round-trip time for packet-data communication over the radio-link comprises measuring a time interval between transmission of a data packet over the radio-link and receipt of an acknowledgement thereto provided by a predetermined protocol layer of the radio-link that provides acknowledgements for transmitted packets.

16. A method according to claim 15, wherein the measured round-trip time for packet-data communication over the radio-link is a round-trip time at an L3CE layer of a UMTS protocol stack.

17. A method according to claim 13, further comprising transmitting a value representative of the calculated transmission window size to the network host.

18. A method according to claim 13, further comprising adjusting a time-out value of a retransmission timer used to determine when to retransmit a data packet.

19. A method according to claim 18, further comprising detecting significant increments in round-trip time over the radio-link, and when a significant increment is detected, prolonging a retransmission time-out value for each data packet that has been transmitted and for which a retransmission timer is running, as well as prolonging a retransmission time-out value for one or more data packets remaining to be transmitted.

20. A method according to claim 19, comprising:
measuring a deviation in end-to-end round-trip times;
measuring a difference between most recent measurements of round-trip time over the radio-link; and
detecting the significant increment when the measured difference between the most recent measurements of round-trip time over the radio-link exceeds the deviation in end-to-end round-trip times by a predetermined threshold value.

21. A method according to claim 18, comprising increasing the time-out value of the retransmission timer when changes in values of round-trip times over the radio-link exceed a multiple of a mean deviation.

22. A method according to claim 18, comprising increasing the time-out value of the retransmission timer when more than a predetermined number of data packets are communicated upon the communication path without acknowledgement thereto.

23. A method according to claim 18, comprising increasing the time-out value of the retransmission timer for a selected number of data packets that are subsequently to be retransmitted.

24. A method according to claim 13, wherein all steps of the method are performed at the mobile host.

25. An apparatus comprising:
a radio-link flow monitor, a radio-link characteristic detector, a transmission window size calculator, and associated logic that, when executed:
causes the radio-link flow monitor to measure a packet-data throughput rate in a packet-based communication upon at least one of a forward link or a reverse link of a radio-link in a radio part of a communication path between the apparatus and a network host, to generate a corresponding indication of the packet-data throughput rate measured upon the at least one of the forward link or the reverse link of the radio-link;
causes the radio-link characteristic detector to measure an end-to-end round-trip time for packet-based communication over the communication path between the apparatus and the network host, said end-to-end round-trip time representing a total time taken for packet-based communication over the radio part of the communication path and a wire-line part of the communication path, estimate an amount of time spent in retransmission of packet data over the radio-link in the radio part of the communication path, calculate a modified round-trip time for packet-based communication over the communication path between the apparatus and the network host by subtracting the estimate of the amount of time spent in retransmission of packet data over the radio-link from the measured end-to-end round-trip time, and generate a corresponding indication of the modified round-trip time; and
causes the transmission window size calculator to receive the indication of the packet-data throughput rate measured upon the at least one of the forward link or the reverse link of the radio-link from the radio-link flow monitor, receive the indication of the modified round-trip time from the radio-link characteristic detector, and calculate a transmission window size within which to transmit a data packet based at least in part upon said indication of the packet-data throughput rate measured upon the at least one of the forward link or the reverse link of the radio-link, and said indication of the modified round-trip time, thereby taking into account an effect of packet-data retransmission over the radio-link in calculating the transmission window size.

26. An apparatus according to claim 25, wherein the apparatus comprises logic that, when executed, causes the radio-link characteristic detector to estimate the amount of time spent in retransmission of packet data over the radio-link by:
measuring a round-trip time for packet-data communication over the radio-link; and
subtracting an optimal value of round-trip time over the radio-link that excludes bit-errors and retransmissions from the measured round-trip time for packet-data communication over the radio-link.

27. An apparatus according to claim 26, wherein the apparatus comprises logic that, when executed, causes the radio-link characteristic detector to measure the round-trip time for packet-data communication over the radio-link by measuring a time interval between transmission of a data packet and receipt of an acknowledgement thereto provided by a predetermined protocol layer of the radio-link that provides acknowledgements for transmitted packets.

28. An apparatus according to claim 27, wherein the apparatus comprises logic that, when executed, causes the radio-link characteristic detector to measure the round-trip time for packet-data communication over the radio-link at an L3CE layer of a UMTS protocol stack.

29. An apparatus according to claim 25, wherein the apparatus comprises logic that, when executed, causes the transmission window size calculator to provide a value representative of the calculated transmission window size to a transmitter for communication to the network host.

30. An apparatus according to claim 25, further comprising a retransmission time-out value selector and associated logic that, when executed, causes the retransmission time-out value selector to adjust a time-out value of a retransmission timer used to determine when to retransmit a data packet.

31. An apparatus according to claim 30, wherein the apparatus comprises logic that, when executed, causes the retransmission time-out value selector to detect significant increments in round-trip time over the radio-link, and when a significant increment is detected, to prolong a retransmission time-out value for each data packet that has been transmitted and for which a retransmission timer is running, as well as to prolong a retransmission time-out value for one or more data packets remaining to be transmitted.

32. An apparatus according to claim 31, wherein the apparatus comprises logic that, when executed, causes the retransmission time-out value selector to:
measure a deviation in end-to-end round-trip times;
measure a difference between most recent measurements of round-trip time over the radio-link; and
detect the significant increment when the measured difference between the most recent measurements of round-trip time over the radio-link exceeds the deviation in end-to-end round-trip times by a predetermined threshold value.

33. An apparatus according to claim 30, wherein the apparatus further comprises logic that, when executed, causes the retransmission time-out value selector to increase the time-out value of the retransmission timer when changes in values of round-trip times over the radio-link exceed a multiple of a mean deviation.

34. An apparatus according to claim 30, wherein the apparatus further comprises logic that, when executed, causes the retransmission time-out value selector to increase the time-out value of the retransmission timer when more than a predetermined number of data packets are communicated upon the communication path without acknowledgement thereto.

35. An apparatus according to claim 30, wherein the apparatus further comprises logic that, when executed, causes the retransmission time-out value selector to increase the time-out value of the retransmission timer for a selected number of data packets that are subsequently to be retransmitted.

36. An apparatus according to claim 30, wherein the retransmission time-out value selector and said associated logic are provided in the mobile host.

37. An apparatus according to claim 25, wherein the radio-link flow monitor, the radio-link characteristic detector, the transmission window size calculator, and said associated logic are provided in the mobile host.

38. A mobile telecommunications terminal comprising: a transmitter portion; a receiver portion; and a controller operable to control operation of the receiver portion and the transmitter portion, and to select a window size for transmission of data packets in a packet-based communication over a communication path between the mobile telecommunications terminal and a network host by:
measuring a packet-data throughput rate upon at least one of a forward link or a reverse link of a radio-link in a radio part of the communication path
estimating an amount of time spent in retransmission of packet data over the radio-link in the radio part of the communication path;
measuring an end-to-end round-trip time for packet-based communication over the communication path between the mobile telecommunications terminal and the network host, said end-to-end round-trip time representing a total time for packet-based communication over the radio part of the communication path and a wire-line part of the communication path;
calculating a modified end-to-end round-trip time for packet-based communication over the communication path between the mobile telecommunications terminal and the network host by subtracting the estimate of the amount of time spent in retransmission of packet data over the radio-link from the measured end-to-end round-trip time for packet-based communication over the communication path between the mobile telecommunications terminal and the network host; and
calculating a transmission window size within which to transmit a data packet as a mathematical product of the measured packet-data throughput rate upon the at least one of the forward link or the reverse link of the radio-link, and the modified end-to-end round-trip time, thereby taking into account an effect of packet-data retransmission over the radio-link in calculating the transmission window size.

39. A mobile telecommunications terminal according to claim 38, wherein the controller is operable to estimate the amount of time spent in retransmission of packet data over the radio-link by:
measuring a round-trip time for packet-data communication over the radio-link; and
subtracting an optimal value of round-trip time over the radio-link that excludes bit-errors and retransmissions from the measured round-trip time for packet-data communication over the radio-link.

40. A mobile telecommunications terminal according to claim 39, wherein the controller is operable to measure the round-trip time for packet-data communication over the radio-link by measuring a time interval between transmission of a data packet over the radio-link and receipt of an acknowledgement thereto provided by a predetermined protocol layer of the radio-link that provides acknowledgements for transmitted packets.

41. A mobile telecommunications terminal according to claim 40, wherein the controller is operable to measure the round-trip time for packet-data communication over the radio-link at an L3CE layer of a UMTS protocol stack.

42. A mobile telecommunications terminal according to claim 38, wherein the transmitter portion is operable to transmit a value representative of the calculated transmission window size to the network host.

43. A mobile telecommunications terminal according to claim 38, wherein the controller is operable to adjust a time-out value of a retransmission timer used to determine when to retransmit a data packet.

44. A mobile telecommunications terminal according to claim 43, wherein the controller is operable to increase the time-out value of the retransmission timer when changes in values of round-trip times over the radio-link exceed a multiple of a mean deviation.

45. A mobile telecommunications terminal according to claim 43, wherein the controller is operable to increase the time-out value of the retransmission timer when more than a predetermined number of data packets are communicated upon the communication path without acknowledgement thereto.

46. A mobile telecommunications terminal according to claim 43, wherein the controller is operable to increase the time-out value of the retransmission timer for a selected number of data packets that are subsequently to be retransmitted.

47. A mobile telecommunications terminal according to claim 43, wherein the controller is operable to detect significant increments in round-trip time over the radio-link, and when a significant increment is detected, to prolong a retransmission time-out value for each data packet that has been transmitted and for which a retransmission timer is running, as well as to prolong a retransmission time-out value for one or more data packets remaining to be transmitted.

48. A mobile telecommunications terminal according to claim 47, wherein the controller is operable to:
measure a deviation in end-to-end round-trip times;
measure a difference between most recent measurements of round-trip time over the radio-link; and
detect the significant increment when the measured difference between the most recent measurements of round-trip time over the radio-link exceeds the deviation in end-to-end round-trip times by a predetermined threshold value.

* * * * *

UNITED STATES PATENT AND TRADEMARK OFFICE
CERTIFICATE OF CORRECTION

PATENT NO.        : 9,007,123 B2                              Page 1 of 1
APPLICATION NO.   : 10/880027
DATED             : April 14, 2015
INVENTOR(S)       : Jarmo Kuusinen et al.

It is certified that error appears in the above-identified patent and that said Letters Patent is hereby corrected as shown below:

In the claims

In Column 21, Claim 38, Line 28
    Delete "communication path" and replace with --communication path;--.

Signed and Sealed this
Third Day of November, 2015

Michelle K. Lee
*Director of the United States Patent and Trademark Office*